(12) United States Patent
Usami et al.

(10) Patent No.: US 12,645,305 B2
(45) Date of Patent: *Jun. 2, 2026

(54) INFORMATION PROCESSING APPARATUS, SYSTEM, AND CONTROL METHOD FOR ACQUIRING CHARACTER STRING TO SORT ARTICLES

(71) Applicant: KABUSHIKI KAISHA TOSHIBA, Tokyo (JP)

(72) Inventors: Yusuke Usami, Tokyo (JP); Kazutaka Asahi, Kawasaki Kanagawa (JP); Masataka Sato, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 24 days.

This patent is subject to a terminal disclaimer.

(21) Appl. No.: 17/929,845

(22) Filed: Sep. 6, 2022

(65) Prior Publication Data

US 2022/0413623 A1 Dec. 29, 2022

Related U.S. Application Data

(63) Continuation of application No. PCT/JP2021/007965, filed on Mar. 2, 2021.

(30) Foreign Application Priority Data

Mar. 9, 2020 (JP) ................................. 2020-039628

(51) Int. Cl.
G06F 3/023 (2006.01)
G06V 10/98 (2022.01)
G06V 30/148 (2022.01)

(52) U.S. Cl.
CPC ............ G06F 3/0233 (2013.01); G06V 10/98 (2022.01); G06V 30/153 (2022.01)

(58) Field of Classification Search
CPC ..... G06F 3/0233; G06V 30/153; G06V 10/98
See application file for complete search history.

(56) References Cited

U.S. PATENT DOCUMENTS

2005/0269395 A1* 12/2005 Miette ....................... B07C 3/14
235/375
2006/0131378 A1 6/2006 Baker et al.
(Continued)

FOREIGN PATENT DOCUMENTS

JP 2005-7315 A 1/2005
JP 2005-174320 A 6/2005
(Continued)

OTHER PUBLICATIONS

Japan Patent Office, International Search Report in PCT/JP2021/007965 (May 11, 2021), 2 pages.
(Continued)

*Primary Examiner* — Reji Kartholy

(74) *Attorney, Agent, or Firm* — Finnegan, Henderson, Farabow, Garrett & Dunner, LLP

(57) ABSTRACT

According to an embodiment, the information processing apparatus includes an image interface, an input interface, a communication interface, and a processor. The image interface is configured to acquire a display screen image from an input device for inputting a character string included in a captured image in which recognition of the character string according to a first algorithm fails. The processor is configured to search for the captured image corresponding to the display screen image, acquire the character string based on a result of character recognition processing of the searched for captured image according to a second algorithm, and input the character string to the input device.

8 Claims, 8 Drawing Sheets

(56)         References Cited

U.S. PATENT DOCUMENTS

| | | | | |
|---|---|---|---|---|
| 2006/0253406 | A1* | 11/2006 | Caillon | G06V 10/40 705/410 |
| 2007/0215529 | A1* | 9/2007 | Desprez | G06V 30/424 209/584 |
| 2009/0110284 | A1* | 4/2009 | Lamprecht | G10L 15/26 382/187 |
| 2009/0324105 | A1 | 12/2009 | Tanaka | |
| 2010/0014706 | A1* | 1/2010 | Rosenbaum | B07C 3/00 382/101 |
| 2012/0140980 | A1* | 6/2012 | Nishiwaki | G06V 30/147 382/101 |
| 2015/0070509 | A1* | 3/2015 | Watanabe | G06Q 10/083 348/184 |
| 2017/0124413 | A1 | 5/2017 | Deng | |
| 2017/0185632 | A1* | 6/2017 | Lee | G06V 40/161 |
| 2018/0089507 | A1* | 3/2018 | Desprez | G06V 20/80 |
| 2018/0260669 | A1* | 9/2018 | Konishi | G06T 1/0014 |
| 2019/0108415 | A1 | 4/2019 | Kumar et al. | |
| 2019/0362485 | A1* | 11/2019 | Piegay | B07C 3/20 |
| 2020/0089944 | A1* | 3/2020 | Sasagawa | G06V 30/414 |
| 2021/0044424 | A1* | 2/2021 | Desprez | G06V 10/7715 |

FOREIGN PATENT DOCUMENTS

| | | |
|---|---|---|
| JP | 2010-9410 A | 1/2010 |
| JP | 2019-109729 A | 7/2019 |
| WO | WO 95/11492 A1 | 4/1995 |
| WO | WO 00/05679 A1 | 2/2000 |

OTHER PUBLICATIONS

Intellectual Property Office of Singapore, Office Action in SG App. No. 11202252570N, 9 pages (Dec. 3, 2024).

* cited by examiner

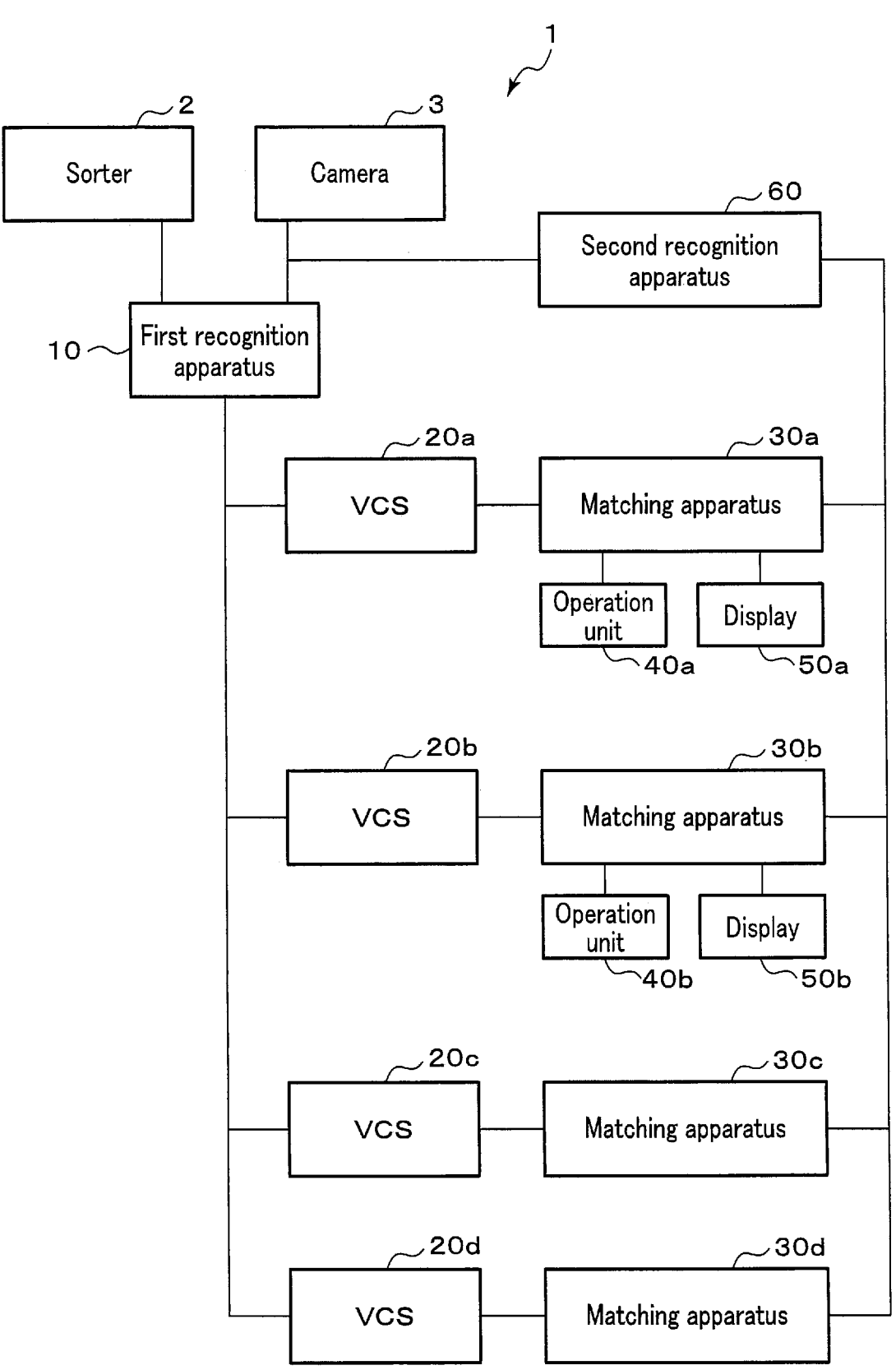
F I G. 1

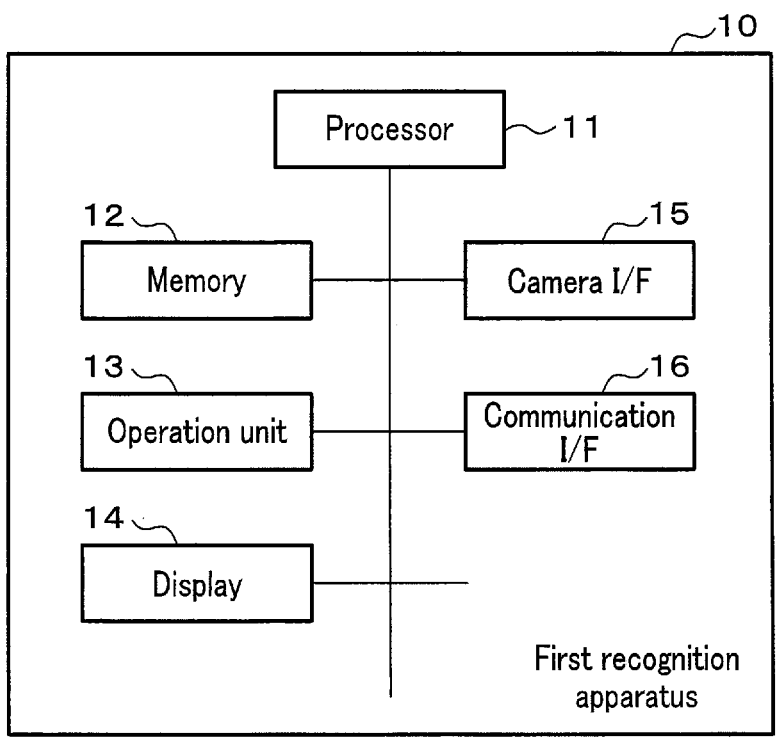
F I G. 2
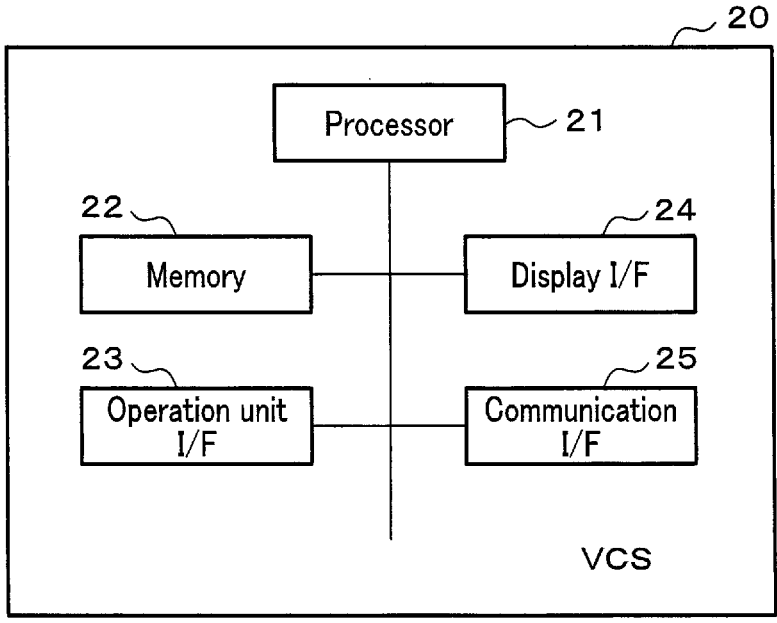
F I G. 3

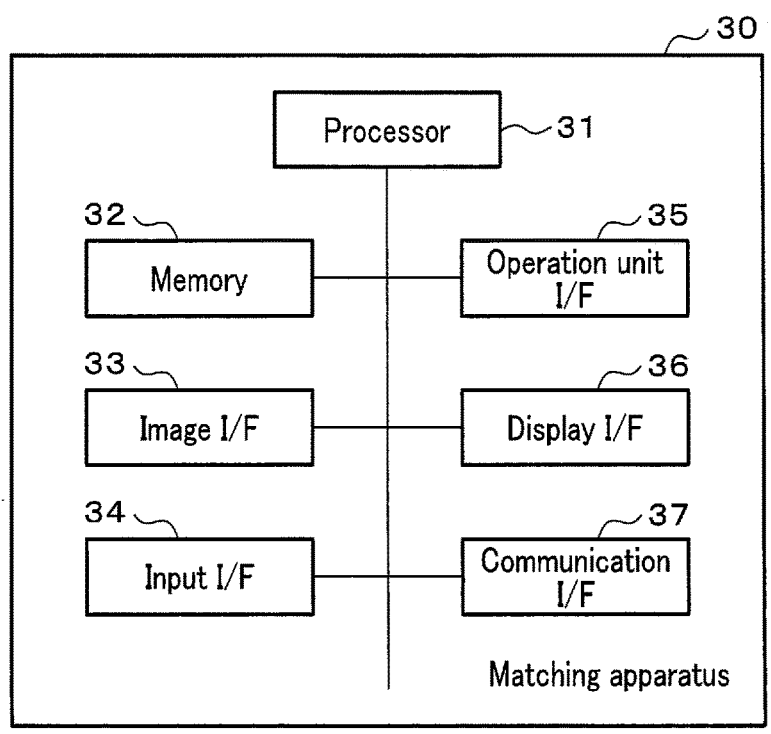
F I G. 4
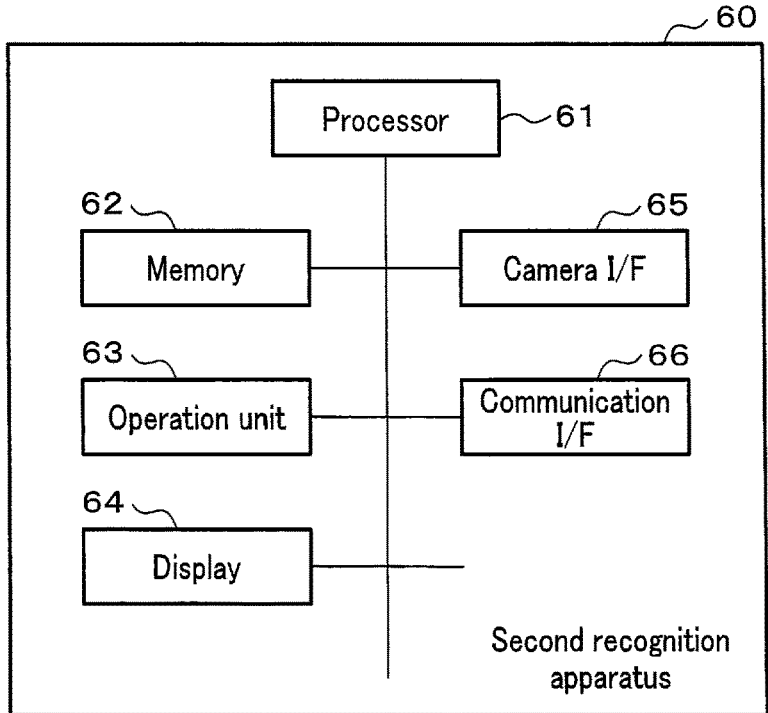
F I G. 5

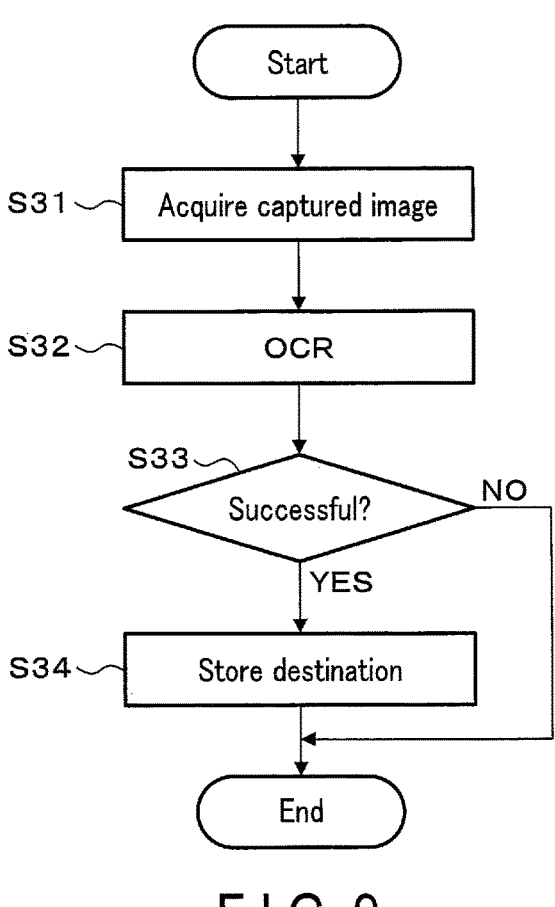
F I G. 9
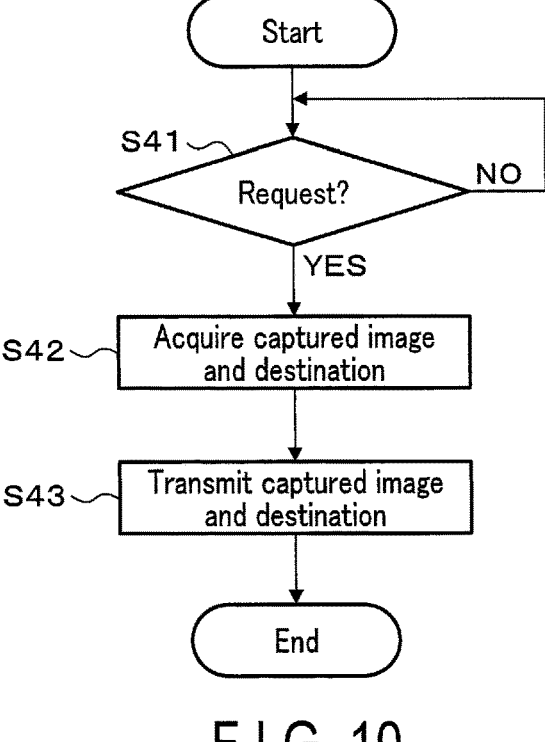
F I G. 10

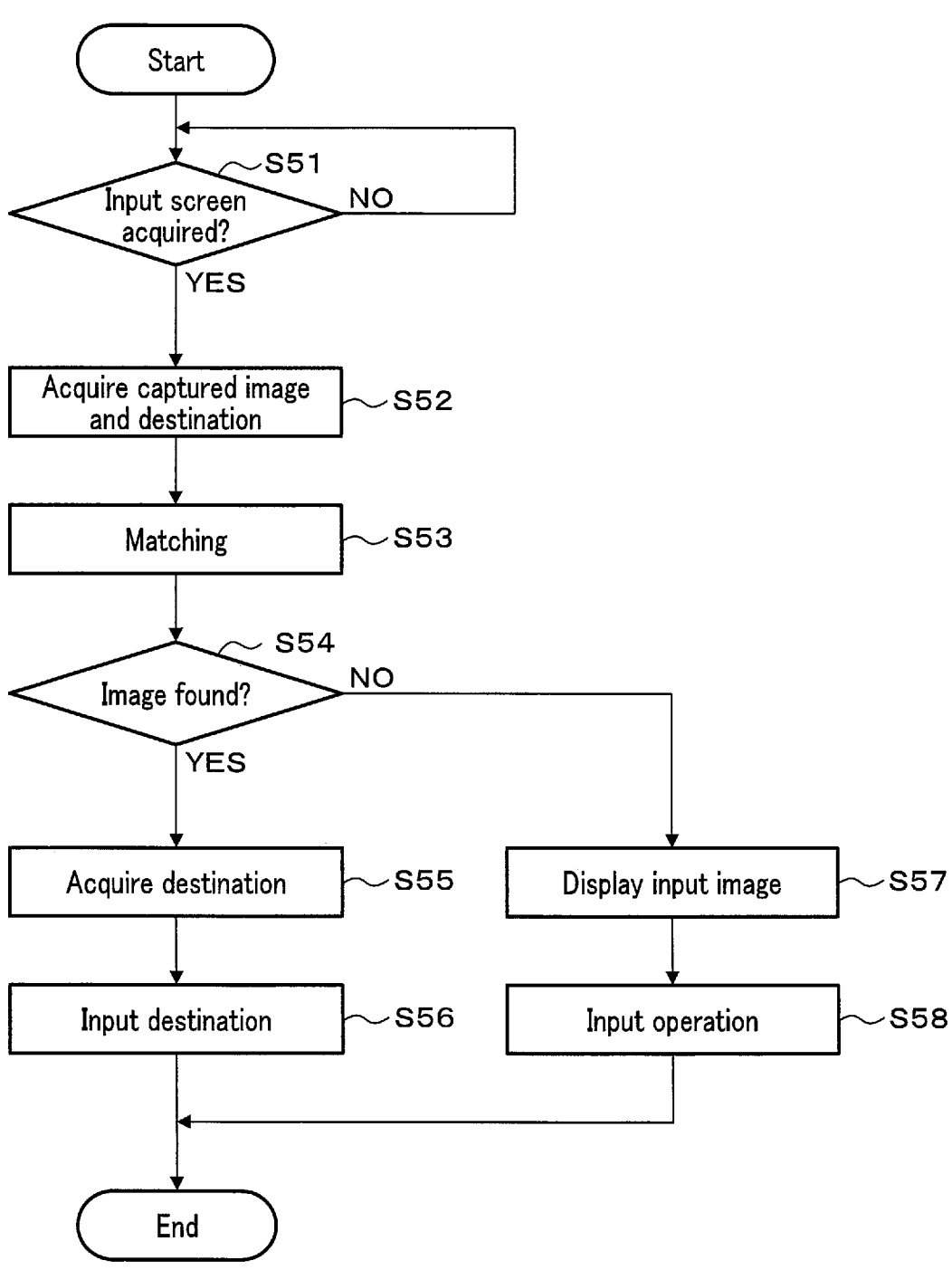
F I G. 11

INFORMATION PROCESSING APPARATUS, SYSTEM, AND CONTROL METHOD FOR ACQUIRING CHARACTER STRING TO SORT ARTICLES

CROSS REFERENCE TO RELATED APPLICATIONS

This application is a Continuation Application of PCT Application No. PCT/JP2021/007965, filed Mar. 2, 2021 and based upon and claiming the benefit of priority from Japanese Patent Application No. 2020-039628, filed Mar. 9, 2020, the entire contents of all of which are incorporated herein by reference.

FIELD

Embodiments described herein relate generally to an information processing apparatus, a system, and a control method.

BACKGROUND

There is provided a recognition system including a recognition apparatus that reads a character string such as an address by optical character recognition (OCR) processing and a video coding system (VCS) that receives input of the character string from an operator if the recognition apparatus fails to recognize the character string.

In such a recognition system, it is necessary to modify the recognition apparatus in order to improve the accuracy of the character string recognition.

Under the circumstances, there is a demand for a technique for effectively acquiring a character string without modifying an existing recognition system.

CITATION LIST

Patent Literature

Patent Literature 1: Japanese Patent Application KOKAI Publication No. 2005-007315

SUMMARY

Technical Problem

To solve the above problem, an information processing apparatus, a system, and a control method capable of effectively acquiring a character string are provided.

Solution to Problem

According to an embodiment, an information processing apparatus includes an image interface, an input interface, a communication interface, and a processor. The image interface is configured to acquire a display screen image from an input device for inputting a character string included in a captured image in which recognition of the character string according to a first algorithm fails, the display screen image being based at least on the captured image displayed on a display screen of the input device. The input interface is configured to input the character string to the input device. The communication interface is configured to acquire the captured image from an image acquisition device. The processor is configured to search for the captured image corresponding to the display screen image, acquire the character string based on a result of character recognition processing of the searched for captured image according to a second algorithm different from the first algorithm, and input the character string to the input device through the input interface.

BRIEF DESCRIPTION OF THE DRAWINGS

FIG. 1 is a block diagram showing a configuration example of a recognition system according to an embodiment.

FIG. 2 is a block diagram showing a configuration example of a first recognition apparatus according to the embodiment.

FIG. 3 is a block diagram showing a configuration example of a VCS according to the embodiment.

FIG. 4 is a block diagram showing a configuration example of a matching apparatus according to the embodiment.

FIG. 5 is a block diagram showing a configuration example of a second recognition apparatus according to the embodiment.

FIG. 9 is a flowchart showing an operation example of the second recognition apparatus according to the embodiment.

FIG. 10 is a flowchart showing an operation example of the second recognition apparatus according to the embodiment.

FIG. 11 is a flowchart showing an operation example of the matching apparatus according to the embodiment.

DETAILED DESCRIPTION

Figure 6:
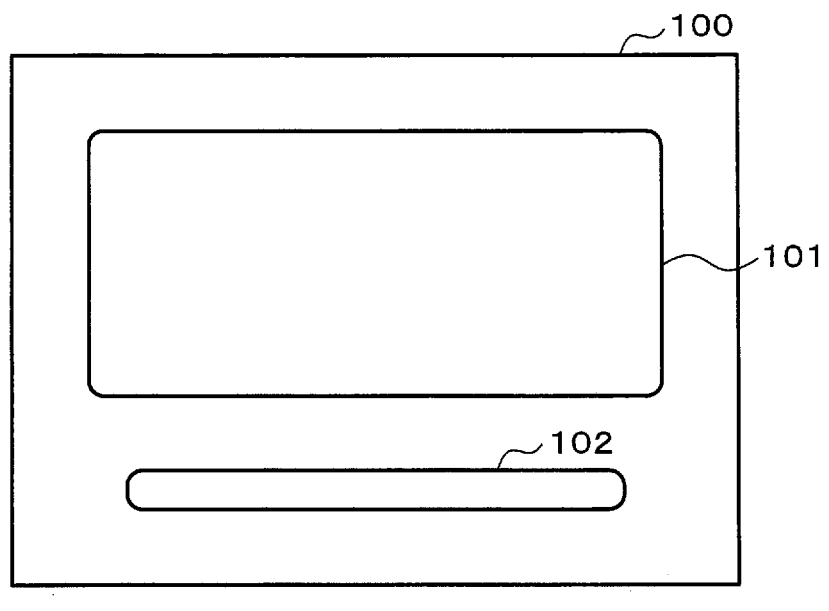
FIG. 6 is a diagram showing an example of an input screen according to the embodiment.

An embodiment will be described below with reference to the drawings.

A recognition system according to the embodiment reads a destination such as an address from an article fed to a sorter. The recognition system sets a sorting destination (e.g., a chute of the sorter) of the article based on the read destination. If the recognition system fails to read the destination, the recognition system receives input of the destination from an operator who has visually confirmed the destination.

FIG. 1 shows a configuration example of a recognition system 1 according to the embodiment. As shown in FIG. 1, the recognition system 1 includes a sorter 2, a camera 3, a first recognition apparatus 10, VCSs 20 (20a to 20d), matching apparatuses 30 (30a to 30d), operation units 40 (40a and 40b), displays 50 (50a and 50b), a second recognition apparatus 60, etc.

The first recognition apparatus 10 is connected to the sorter 2, the camera 3, and the VCSs 20. The VCSs 20a to 20d are connected to the matching apparatuses 30a to 30d, respectively. The matching apparatuses 30a and 30b are connected to the operation units 40a and 40b, respectively. The matching apparatuses 30a and 30b are connected to the displays 50a and 50b, respectively. The second recognition apparatus 60 is connected to the camera 3 and the matching apparatuses 30.

The recognition system 1 may adopt further configurations as necessary in addition to that shown in FIG. 1, or certain structures may be excluded from the recognition system 1.

The sorter 2 sorts fed articles to sorting destinations based on a signal from the first recognition apparatus 10. For example, the sorter 2 includes a plurality of chutes as sorting destinations. The sorter 2 feeds an article to a chute based on a signal from the first recognition apparatus 10. For example, the sorter 2 acquires, from the first recognition apparatus 10, sorting information indicating an ID for specifying an article and a sorting destination (e.g., a chute number) to which that article is to be fed. The sorter 2 feeds an article to a chute based on the sorting information.

The camera 3 (an image acquisition device) captures an image of an article fed to the sorter 2. The camera 3 captures an image of a surface (a destination surface) of the article on which the destination of the article is written. For example, the camera 3 is installed on a conveying path along which the articles are fed to the sorter 2. The camera 3 may capture images of multiple surfaces of an article. The camera 3 then transmits the captured images to the first recognition apparatus 10 and the second recognition apparatus 60.

The first recognition apparatus 10 sets a sorting destination of an article in the sorter 2 based on an image (a captured image) from the camera 3, etc. For example, the first recognition apparatus 10 transmits, to the sorter 2, sorting information indicating an ID for identifying an article and a sorting destination to which that article is to be fed. The first recognition apparatus 10 will be described in detail later.

The VCSs 20 are input devices for, if the first recognition apparatus 10 fails to recognize a destination, inputting the destination included in a captured image (a captured image of a destination surface) in which recognition of the destination fails. The VCSs 20 will be described in detail later.

The matching apparatuses 30 (an information processing apparatus) input a destination from the second recognition apparatus 60 to the VCSs 20. The matching apparatuses 30 will be described in detail later.

The operation units 40 receive input of various operations from an operator. The operation units 40 then transmit signals indicating the input operations to the matching apparatuses 30. The operation units 40 are each constituted by a keyboard, buttons, a touch panel, or the like.

The displays 50 display information based on control from the matching apparatuses 30. For example, the displays 50 are each constituted by a liquid crystal monitor. If the operation unit 40 is constituted by a touch panel, the display 50 is constituted by a liquid crystal monitor formed integrally with the operation unit 40.

The recognition system 1 may include operation units and displays that are connected to the matching apparatuses 30c and 30d.

The second recognition apparatus 60 recognizes a destination from a captured image through OCR processing (character recognition processing). The second recognition apparatus 60 transmits the captured image and the recognized destination to the matching apparatuses 30.

Next, the first recognition apparatus 10 will be described.

FIG. 2 shows a configuration example of the first recognition apparatus 10. As shown in FIG. 2, the first recognition apparatus 10 includes a processor 11, a memory 12, an operation unit 13, a display 14, a camera interface 15, a communication interface 16, etc. The processor 11 is communicably connected to the memory 12, operation unit 13, display 14, camera interface 15, and communication interface 16 via a data bus, a predetermined interface, or the like.

The first recognition apparatus 10 may adopt further configurations as necessary in addition to that shown in FIG. 2, or certain structures may be excluded from the first recognition apparatus 10.

The processor 11 controls the overall operation of the first recognition apparatus 10. For example, the processor 11 generates sorting information based on a recognition result of a destination, etc., and transmits the sorting information to the sorter 2.

For example, the processor 11 is constituted by a CPU or the like. The processor 11 may also be constituted by an application specific integrated circuit (ASIC) or the like. The processor 11 may also be constituted by a field programmable gate array (FPGA) or the like.

The memory 12 stores various types of data. For example, the memory 12 functions as a ROM, a RAM, and an NVM.

For example, the memory 12 stores a control program, control data, etc. The control program and the control data are incorporated in advance according to the specification of the first recognition apparatus 10. For example, the control program is a program that supports a function implemented by the first recognition apparatus 10.

Further, the memory 12 temporarily stores data being processed by the processor 11, etc. The memory 12 may also store data necessary for executing an application program, a result of executing the application program, etc.

The operation unit 13 receives input of various operations from an operator. The operation unit 13 transmits signals indicating the input operations to the processor 11. The operation unit 13 is constituted by a keyboard, buttons, a touch panel, or the like.

The display 14 displays information based on control from the processor 11. For example, the display 14 is constituted by a liquid crystal monitor. If the operation unit 13 is constituted by a touch panel, the display 14 is constituted by a liquid crystal monitor formed integrally with the operation unit 13.

The camera interface 15 is an interface for transmitting and receiving data to and from the camera 3. For example, the camera interface 15 is connected to the camera 3 by wire. The camera interface 15 receives a captured image from the camera 3. The camera interface 15 transmits the received captured image to the processor 11. The camera interface 15 may supply power to the camera 3.

The communication interface 16 is an interface for transmitting and receiving data to and from the sorter 2 and the VCSs 20. For example, the communication interface 16 supports a local area network (LAN) connection. For example, the communication interface 16 may support a universal serial bus (USB) connection. The communication interface 16 may be constituted by an interface for transmitting and receiving data to and from the sorter 2 and an interface for transmitting and receiving data to and from the VCSs 20.

Next, the VCSs 20 will be described.

Since the VCSs 20a to 20d have the same configuration, they will be described as the VCS 20.

FIG. 3 shows a configuration example of the VCS 20. As shown in FIG. 3, the VCS 20 includes a processor 21, a memory 22, an operation unit interface 23, a display interface 24, a communication interface 25, etc. The processor 21 is communicably connected to the memory 22, operation unit interface 23, display interface 24, and communication interface 25 via a data bus, a predetermined interface, or the like.

The VCS 20 may adopt further configurations as necessary in addition to that shown in FIG. 3, or certain structures may be excluded from the VCS 20.

The processor 21 controls the overall operation of the VCS 20. For example, the processor 21 outputs a captured image in which recognition of a destination fails through the display interface 24.

For example, the processor 21 is constituted by a CPU or the like. The processor 21 may also be constituted by an ASIC or the like. The processor 21 may also be constituted by an FPGA or the like.

The memory 22 stores various types of data. For example, the memory 22 functions as a ROM, a RAM, and an NVM.

For example, the memory 22 stores a control program, control data, etc. The control program and the control data are incorporated in advance according to the specification of the VCS 20. For example, the control program is a program that supports a function implemented by the VCS 20.

The memory 22 temporarily stores data being processed by the processor 21, etc. The memory 22 may also store data necessary for executing an application program, a result of executing the application program, etc.

The operation unit interface 23 is an interface for transmitting and receiving data to and from an input device that receives input of an operation. For example, the operation unit interface 23 receives, from the input device, an operation signal indicating an operation (a key input operation) input on the keyboard. The operation unit interface 23 transmits the received operation signal to the processor 21. The operation unit interface 23 may supply power to the input device. For example, the operation unit interface 23 supports a USB connection.

The display interface 24 is an interface for transmitting and receiving data to and from a display device that displays an image. The display interface 24 outputs, to the display device, image data from the processor 21.

The communication interface 25 is an interface for transmitting and receiving data to and from the first recognition apparatus 10 and the matching apparatus 30. For example, the communication interface 25 supports a LAN connection. For example, the communication interface 25 may support a USB connection. The communication interface 25 may be constituted by an interface for transmitting and receiving data to and from the first recognition apparatus 10 and an interface for transmitting and receiving data to and from the matching apparatus 30.

Next, the matching apparatuses 30 will be described.

Since the matching apparatuses 30*a* to 30*d* have the same configuration, they will be described as the matching apparatus 30.

FIG. 4 shows a configuration example of the matching apparatus 30. As shown in FIG. 4, the matching apparatus 30 includes a processor 31, a memory 32, an image interface 33, an input interface 34, an operation unit interface 35, a display interface 36, a communication interface 37, etc. The processor 31 is communicably connected to the memory 32, image interface 33, input interface 34, operation unit interface 35, display interface 36, and communication interface 37 via a data bus, a predetermined interface, or the like.

The matching apparatus 30 may adopt further configurations as necessary in addition to that shown in FIG. 4, or certain structures may be excluded from the matching apparatus 30.

The processor 31 (a second processor) controls the overall operation of the matching apparatus 30. For example, the processor 31 inputs a destination from the second recognition apparatus 60 to the VCS 20.

For example, the processor 31 is constituted by a CPU or the like. The processor 31 may also be constituted by an ASIC or the like. The processor 31 may also be constituted by an FPGA or the like.

The memory 32 stores various types of data. For example, the memory 32 functions as a ROM, a RAM, and an NVM.

For example, the memory 32 stores a control program, control data, etc. The control program and the control data are incorporated in advance according to the specification of the matching apparatus 30. For example, the control program is a program that supports a function implemented by the matching apparatus 30.

The memory 32 temporarily stores data being processed by the processor 31, etc. The memory 32 may also store data necessary for executing an application program, a result of executing the application program, etc.

The image interface 33 is connected to the display interface 24 of the VCS 20. The image interface 33 acquires an image from the display interface 24. Specifically, the image interface 33 acquires an image to be displayed on the display device by the processor 21 of the VCS 20. The image interface 33 transmits the acquired image to the processor 31. For example, the image interface 33 is constituted by a capture board or the like.

The input interface 34 is connected to the operation unit interface 23. The input interface 34 inputs an operation signal indicating a key input operation to the operation unit interface 23 under control of the processor 31. For example, the input interface 34 supports a USB connection.

The operation unit interface 35 is an interface for transmitting and receiving data to and from the operation unit 40. For example, the operation unit interface 35 receives, from the operation unit 40, an operation signal indicating an operation that is input to the operation unit 40. The operation unit interface 35 transmits the received operation signal to the processor 31. The operation unit interface 35 may supply power to the operation unit 40. For example, the operation unit interface 35 supports a USB connection.

The display interface 36 is an interface for transmitting and receiving data to and from the display 50. The display interface 36 outputs, to the display 50, image data from the processor 31.

The communication interface 37 (a second communication interface) is an interface for transmitting and receiving data to and from the VCS 20 and other matching apparatuses 30 and the second recognition apparatus 60. For example, the communication interface 37 supports a LAN connection. For example, the communication interface 37 may support a USB connection. The communication interface 37 may be constituted by an interface for transmitting and receiving data to and from the VCS 20, an interface for transmitting and receiving data to and from other matching apparatuses 30, and an interface for transmitting and receiving data to and from the second recognition apparatus 60.

The matching apparatuses 30*c* and 30*d* may not include the operation unit interface 35 and the display interface 36.

Next, the second recognition apparatus 60 will be described.

FIG. 5 shows a configuration example of the second recognition apparatus 60. As shown in FIG. 5, the second recognition apparatus 60 includes a processor 61, a memory 62, an operation unit 63, a display 64, a camera interface 65, a communication interface 66, etc. The processor 61 is communicably connected to the memory 62, operation unit 63, display 64, camera interface 65, and communication interface 66 via a data bus, a predetermined interface, or the like.

The second recognition apparatus 60 may adopt further configurations as necessary in addition to that shown in FIG. 2, or certain structures may be excluded from the second recognition apparatus 60.

The processor 61 (a first processor) controls the overall operation of the second recognition apparatus 60. For example, the processor 61 acquires a destination from a captured image.

For example, the processor 61 is constituted by a CPU or the like. The processor 61 may also be constituted by an application specific integrated circuit (ASIC) or the like. The processor 61 may also be constituted by a field programmable gate array (FPGA) or the like.

The memory 62 stores various types of data. For example, the memory 62 functions as a ROM, a RAM, and an NVM.

For example, the memory 62 stores a control program, control data, etc. The control program and the control data are incorporated in advance according to the specification of the second recognition apparatus 60. For example, the control program is a program that supports a function implemented by the second recognition apparatus 60.

The memory 62 temporarily stores data being processed by the processor 61, etc. The memory 62 may also store data necessary for executing an application program, a result of executing the application program, etc.

The operation unit 63 receives input of various operations from an operator. The operation unit 63 transmits signals indicating the input operations to the processor 61. The operation unit 63 is constituted by a keyboard, buttons, a touch panel, or the like.

The display 64 displays information based on control from the processor 61. For example, the display 64 is constituted by a liquid crystal monitor. If the operation unit 63 is constituted by a touch panel, the display 64 is constituted by a liquid crystal monitor formed integrally with the operation unit 63.

The camera interface 65 (an image acquisition device interface) is an interface for transmitting and receiving data to and from the camera 3. For example, the camera interface 65 is connected to the camera 3 by wire. The camera interface 65 receives a captured image from the camera 3. The camera interface 65 transmits the received captured image to the processor 61.

The communication interface 66 (a first communication interface) is an interface for transmitting and receiving data to and from the matching apparatuses 30. For example, the communication interface 66 supports a LAN connection. For example, the communication interface 66 may support a USB connection.

Next, the functions implemented by the first recognition apparatus 10 will be described. The functions implemented by the first recognition apparatus 10 are implemented by the processor 11 executing a program stored in the memory 12 or the like.

First, the processor 11 has a function of acquiring a captured image including a destination surface from the camera 3.

The camera 3 captures an image at the time an article passes through an imaging region of the camera 3. The camera 3 transmits the captured image to the first recognition apparatus 10.

The processor 11 acquires the captured image including a destination surface from the camera 3 through the camera interface 15. The processor 11 may transmit a request to the camera 3 and receive a response including a captured image.

The processor 11 also has a function of acquiring a destination from a captured image through OCR processing.

Upon acquiring the captured image, the processor 11 performs OCR processing on the captured image according to a predetermined algorithm (a first algorithm). Upon performing the OCR processing, the processor 11 acquires the destination written on the destination surface of the article based on a result of the OCR processing.

The processor 11 has a function of acquiring a destination using the VCS 20 if the processor 11 fails in the OCR processing.

If the processor 11 fails in the OCR processing and cannot acquire a destination, the processor 11 transmits the captured image to the VCS 20 through the communication interface 16. The processor 11 selects one VCS 20 from the VCS 20a to 20d and transmits the captured image to the selected VCS 20.

As will be described later, the VCS 20 transmits the destination written on the destination surface included in the captured image to the first recognition apparatus 10.

The processor 11 acquires the destination from the VCS 20 through the communication interface 16.

The processor 11 has a function of setting a sorting destination of an article based on the destination acquired by the OCR processing or the destination from the VCS 20.

For example, the processor 11 sets the number of a chute to which an article is fed in the sorter 2 as a sorting destination based on the destination. For example, the processor 11 sets the number of a chute corresponding to an administrative district (prefecture, city, town, village, or the like) of the destination.

The processor 11 transmits sorting information indicating an ID for identifying the article and the sorting destination of that article to the sorter 2 through the communication interface 16.

Next, the functions implemented by the VCS 20 will be described. The functions implemented by the VCS 20 are implemented by the processor 21 executing a program stored in the memory 22 or the like.

The processor 21 has a function of acquiring a captured image including a destination surface from the first recognition apparatus 10.

As described above, if the processor 11 of the first recognition apparatus 10 fails in the OCR processing, the processor 11 transmits the captured image to the VCS 20.

The processor 21 of the VCS 20 acquires the captured image from the first recognition apparatus 10 through the communication interface 25.

The processor 21 also has a function of transmitting the acquired captured image to the matching apparatus 30.

Upon acquiring the captured image, the processor 21 generates an input screen (a display screen) for receiving input of a destination shown in the captured image. The input screen includes the acquired captured image.

FIG. 6 shows an example of an input screen 100 generated by the processor 21. As shown in FIG. 6, the input screen 100 includes an image region 101, an entry field 102, etc.

The image region 101 displays a captured image (a display screen image) acquired from the first recognition apparatus 10. The image region 101 displays the captured image including the destination surface. An image resolution of a character string included in the captured image displayed by the image region 101 may be lower than that of a character string included in the captured image captured by the camera 3.

The entry field 102 is formed below the image region 101. The entry field 102 receives input of the destination written on the destination surface shown in the captured image displayed by the image region 101.

The input screen 100 may also include an icon for fixing the input to the entry field 102, etc.

The entry field 102 may be formed above the image region 101. The configuration of the input screen is not limited to a specific configuration.

Upon generating the input screen, the processor 21 outputs the generated input screen through the display interface 24. The processor 21 outputs the input screen in the same manner as in the case where the display device is connected to the display interface 24. Namely, the processor 21 outputs, through the display interface 24, a signal similar to a signal output to the display device such as a display.

The processor 21 also has a function of receiving input of a destination through the operation unit interface 23.

Upon outputting the input screen, the processor 21 receives input of a destination through the operation unit interface 23. The processor 21 acquires a signal (an operation signal indicating a key input operation) similar to that in a case where an operation unit is connected to the operation unit interface 23.

The processor 21 also has a function of transmitting the received input destination (information indicating the destination) to the first recognition apparatus 10.

Upon receiving an operation signal indicating that the input is fixed (e.g., an operation signal indicating that an enter key is pressed) through the operation unit interface 23, the processor 21 transmits the input destination to the first recognition apparatus 10 through the communication interface 25.

Next, the functions implemented by the second recognition apparatus 60 will be described. The functions implemented by the second recognition apparatus 60 are implemented by the processor 61 executing a program stored in the memory 62 or the like.

First, the processor 61 has a function of acquiring a captured image including a destination surface from the camera 3.

The processor 61 acquires the captured image from the camera 3 through the camera interface 65. The processor 61 acquires, from the camera 3, a captured image similar to the captured image acquired by the first recognition apparatus 10.

The processor 61 also has a function of acquiring a destination from the captured image through OCR processing.

Upon extracting the captured image, the processor 61 performs OCR processing on the captured image according to a predetermined algorithm (a second algorithm) different from the first algorithm. The second algorithm can recognize at least a part of the character image that the first algorithm cannot recognize.

Upon performing the OCR processing, the processor 61 acquires the destination written on the destination surface of the article based on a result of the OCR processing.

If a plurality of captured images are acquired, the processor 61 performs OCR processing on each captured image, and acquires a destination based on a result of the OCR processing.

Upon acquiring the destination, the processor 61 stores the captured image and the destination in association with each other in the memory 62. For example, the processor 61 may store the destination as a file name of the captured image. The processor 61 may set an image ID, etc. to the captured image.

The processor 61 also has a function of transmitting the captured image and the destination in association with each other to the matching apparatus 30.

The processor 61 receives a request for the captured image and the destination from the matching apparatus 30 through the communication interface 66. For example, the request requests a captured image captured by the camera 3 in a predetermined period (or acquired by the processor 61 in a predetermined period) and a destination corresponding to that captured image.

The processor 61 acquires the captured image and the destination from the memory 62 in response to the request. Upon acquiring the captured image and the destination, the processor 61 transmits a response including the captured image and the destination to the matching apparatus 30 through the communication interface 66.

Next, the functions implemented by the matching apparatus 30 will be described. The functions implemented by the matching apparatus 30 are implemented by the processor 31 executing a program stored in the memory 32 or the like.

First, the processor 31 has a function of acquiring an input screen from the VCS 20.

The processor 31 acquires an input screen through the image interface 33 connected to the display interface 24 of the VCS 20. Namely, the processor 31 acquires a captured image including a destination surface from the VCS 20.

The processor 31 also has a function of acquiring a captured image and a destination corresponding to that captured image from the second recognition apparatus 60.

Based on a time at which the input screen is acquired, the processor 31 estimates a time at which the captured image included in that input screen is captured by the camera 3. For example, the processor 31 estimates the time at which the camera 3 captures the image based on a time from when the camera 3 captures the image to when the first recognition apparatus 10 recognizes the destination and the VCS 20 outputs the input screen. The processor 31 estimates a period (an estimation period) having a predetermined width as the time at which the camera 3 captures the image. For example, the processor 31 acquires, as the estimation period, a period between a time preceding the time at which the input screen is acquired by a predetermined time and a time at which a predetermined time has elapsed from that time.

The processor 31 transmits a request for requesting captured images (candidate captured images) captured in the estimation period and destinations corresponding to those images through the communication interface 37. The processor 31 receives a response including those candidate captured images and those destinations from the second recognition apparatus 60 through the communication interface 37.

The processor 31 also has a function of searching for a captured image included in the input screen from the acquired candidate captured images. That is, the processor 31 searches for a candidate captured image corresponding to the captured image included in the input screen.

The processor 31 matches the candidate captured images with the captured image included in the input screen according to a predetermined algorithm. Here, the processor 31 calculates a degree of similarity between each candidate captured image and the captured image included in the input screen.

If the highest degree of similarity exceeds a predetermined threshold value, the processor 31 identifies the candidate captured image corresponding to the degree of similarity and the captured image included in the input screen.

A method by which the processor 31 searches for the captured image included in the input screen from the candidate captured images is not limited to a specific method.

The processor 31 has a function of inputting a destination corresponding to the searched for candidate captured image to the operation unit interface 23 of the VCS 20.

If the search for the captured image included in the input screen is successful, the processor 31 acquires a destination corresponding to the candidate captured image identified with the captured image. Upon acquiring the destination, the processor 31 inputs the acquired destination to the operation unit interface 23 of the VCS 20 through the input interface 34. Namely, the processor 31 inputs to the operation unit interface 23 an operation signal indicating a key input operation of inputting the destination.

The processor 31 may input to the operation unit interface 23 an operation signal indicating an operation of completing input of the destination.

The processor 31 also has a function of inputting an operation signal indicating an operation that is input to the operation unit 40 to the operation unit interface 23 if the search for the captured image included in the input screen fails.

For example, if the highest degree of similarity does not exceed a predetermined threshold, the processor 31 determines that the search for the captured image included in the input screen fails.

If the search for the captured image included in the input screen fails, the processor 31 displays the input screen from the VCS 20 on the display 50. Upon displaying the input screen on the display 50, the processor 31 receives input to the operation unit 40. Upon receiving the input to the operation unit 40, the processor 31 inputs an operation signal indicating the input operation to the operation unit interface 23.

The processor 31 may update the input screen on the display 50. Namely, the processor 31 acquires the input screen from the display interface 24 in real time and displays the input screen on the display 50.

The operator visually observes the image region of the input screen displayed on the display 50 and inputs the destination to the operation unit 40. Upon completing the input of the destination, the operator inputs an operation of completing the input to the operation unit 40.

If the operation unit 40 and the display 50 are not connected to the matching apparatus 30, the processor 31 displays the input screen on the display 50 connected to another matching apparatus 30. The processor 31 also inputs an operation signal indicating the operation that is input to the operation unit 40 connected to the other matching apparatus 30 to the operation unit interface 23 of the VCS 20.

For example, the main matching apparatus 30 (e.g., the matching apparatus 30a) or an external control device may manage the operation unit 40 used for input and the display 50 that displays the input screen.

Next, an operation example of the first recognition apparatus 10 will be described.

Figure 7:
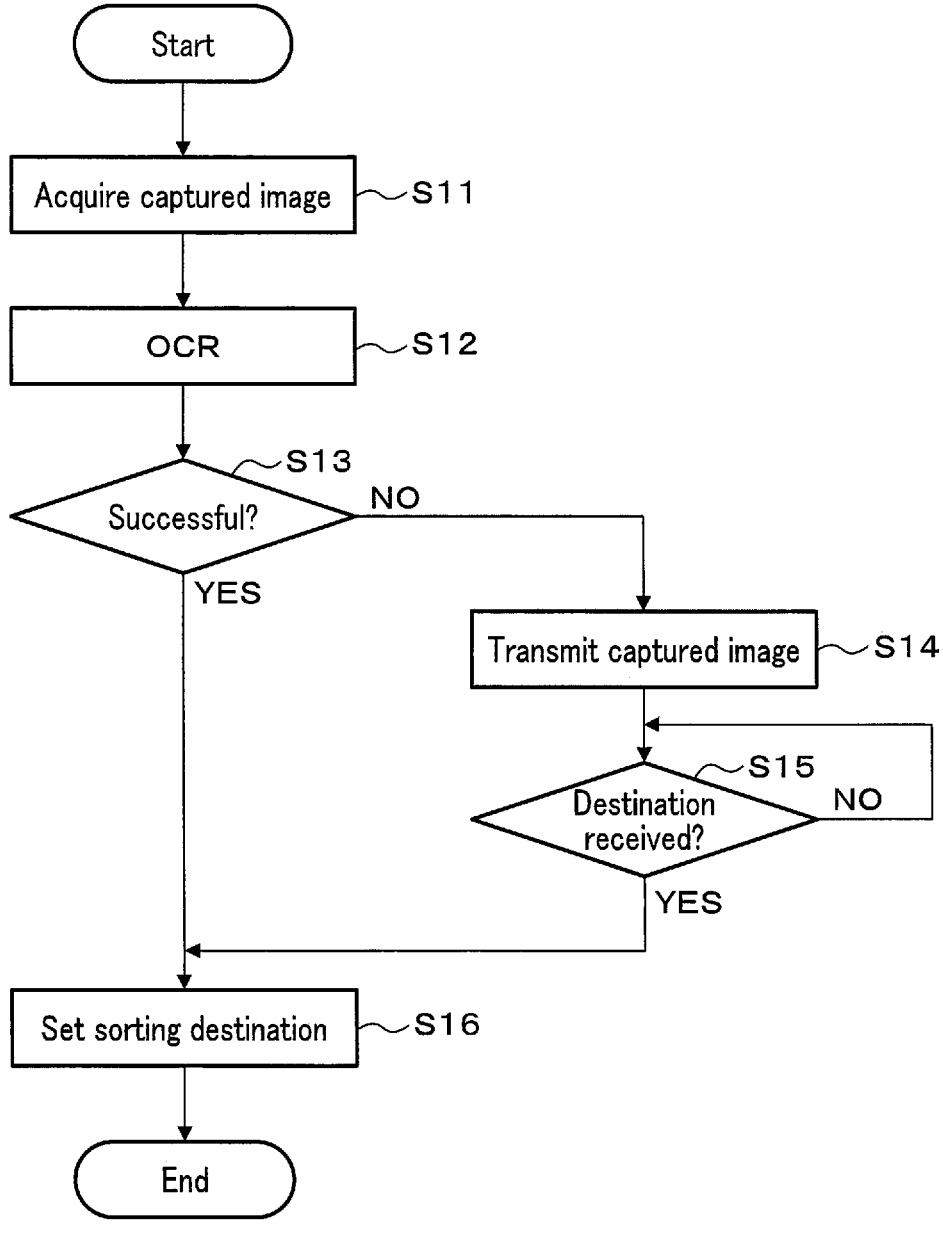
FIG. 7 is a flowchart showing an operation example of the first recognition apparatus according to the embodiment.

FIG. 7 is a flowchart for explaining an operation example of the first recognition apparatus 10.

First, the processor 11 of the first recognition apparatus 10 acquires a captured image including a destination surface of an article through the camera interface 15 (S11). Upon acquiring the captured image, the processor 11 performs OCR processing on the captured image according to the first algorithm (S12).

If the processor 11 fails to acquire a destination through the OCR processing (NO in S13), the processor 11 transmits the captured image to the VCS 20 through the communication interface 16 (S14). Upon transmitting the captured image to the VCS 20, the processor 11 determines whether or not the destination is received from the VCS 20 through the communication interface 16 (S15).

If the processor 11 determines that the destination is not received from the VCS 20 (NO in S15), the processor 11 returns to S15.

If the processor 11 successfully acquires the destination through the OCR processing (YES in S13) or if the processor 11 determines that the destination is received from the VCS 20 (YES in S15), the processor 11 sets a sorting destination of the article in the sorter 2 based on the destination acquired through the OCR processing or the destination received from the VCS 20 (S16).

Upon setting the sorting destination of the article in the sorter 2, the processor 11 ends the operation.

Next, an operation example of the VCS 20 will be described.

Figure 8:
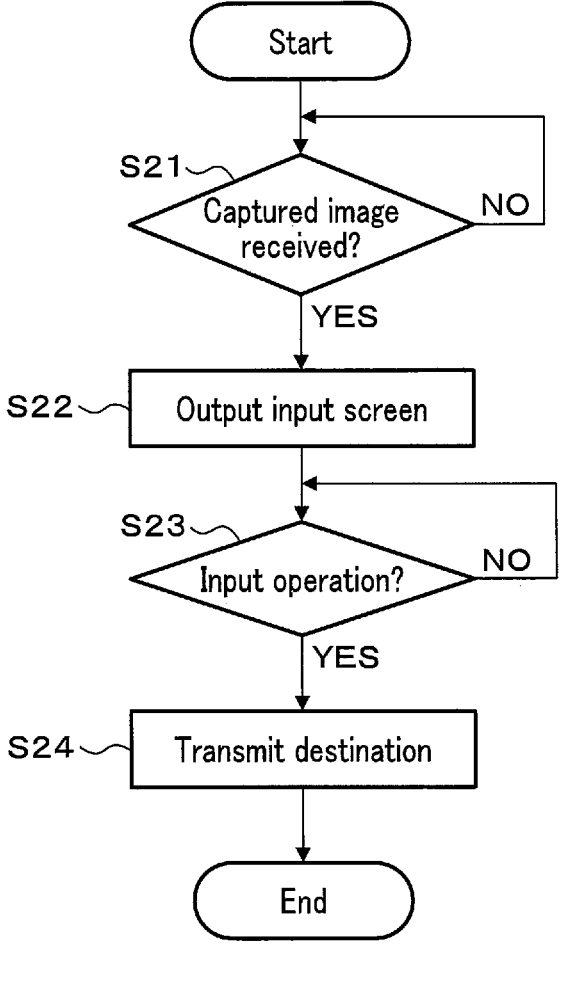
FIG. 8 is a flowchart showing an operation example of the VCS according to the embodiment.

FIG. 8 is a flowchart for explaining an operation example of the VCS 20.

First, the processor 11 of the VCS 20 determines whether or not the captured image is received from the first recognition apparatus 10 through the communication interface 25 (S21). If the processor 11 determines that the captured image is not received from the first recognition apparatus 10 (NO in S21), the processor 11 returns to S21.

If the processor 21 determines that the captured image is received from the first recognition apparatus 10 (YES in S21), the processor 21 outputs an input screen including the captured image through the display interface 24 (S22).

Upon outputting the input screen, the processor 21 determines whether or not input of a destination is received through the operation unit interface 23 (S23). If the processor 21 determines that input of the destination is not received (NO in S23), the processor 21 returns to S23.

If the processor 21 determines that input of the destination is received (YES in S23), the processor 21 transmits the input destination to the first recognition apparatus 10 through the communication interface 25 (S24). Upon transmitting the input destination to the first recognition apparatus 10, the processor 21 ends the operation.

Next, an operation example of the second recognition apparatus 60 will be described.

First, an operation example in which the second recognition apparatus 60 acquires a destination will be explained.

FIG. 9 is a flowchart for explaining an operation example in which the second recognition apparatus 60 acquires a destination.

First, the processor 61 of the second recognition apparatus 60 acquires a captured image including a destination surface of an article through the camera interface 65 (S31). Upon acquiring the captured image, the processor 61 performs OCR processing on the captured image according to the first algorithm (S32).

If the processor 61 successfully acquires the destination through the OCR processing (YES in S33), the processor 61 stores the captured image and the destination in association with each other in the memory 62 (S34).

If the processor 61 fails to acquire the destination through the OCR processing (NO in S33) or if the processor 61 stores the captured image and the destination in association with each other in the memory 62 (S34), the processor 61 ends the operation.

Next, an operation example in which the second recognition apparatus 60 transmits a captured image and a destination will be explained.

FIG. 10 is a flowchart for explaining an operation example in which the second recognition apparatus 60 transmits a captured image and a destination.

First, the processor 61 of the second recognition apparatus 60 determines whether or not a request is received from the matching apparatus 30 through the communication interface 66 (S41). If the processor 61 determines that the request is not received (NO in S41), the processor 61 returns to S41.

If the processor 61 determines that the request is received (YES in S41), the processor 61 acquires a captured image and a destination from the memory 62 in response to the received request (S42). Upon acquiring the captured image and the destination, the processor 61 transmits a response including the captured image and the destination to the matching apparatus 30 through the communication interface 66 (S43).

Upon transmitting the response, the processor 61 ends the operation.

Next, an operation example of the matching apparatus 30 will be described.

FIG. 11 is a flowchart for explaining an operation example of the matching apparatus 30.

The processor 31 of the matching apparatus 30 determines whether or not an input screen is acquired through the image interface 33 (S51). If the processor 31 determines that the input screen is not acquired (NO in S51), the processor 31 returns to S51.

If the processor 31 determines that the input screen is acquired (YES in S51), the processor 31 acquires captured images (candidate captured images) based on a time at which the input screen is acquired and destinations from the second recognition apparatus 60 (S52).

Upon acquiring the candidate captured images and the destinations, the processor 31 searches each candidate captured image for a captured image included in the input screen (S53).

If the processor 31 successfully searches for the captured image included in the input screen (YES in S54), the processor 31 acquires a destination corresponding to a candidate captured image identified with that captured image (S55). Upon acquiring the destination, the processor 31 inputs to the operation unit interface 23 of the VCS 20 an operation signal indicating a key input operation for inputting the destination through the input interface 34 (S56).

If the processor 31 fails to search for the captured image included in the input screen (NO in S54), the processor 31 displays the input screen on the display 50 (S57). Upon displaying the input screen, the processor 31 inputs an operation signal indicating an operation that is input to the operation unit 40 to the operation unit interface 23 of the VCS 20 (S58). The processor 31 performs S58 until receiving input of an input completion operation.

If the operation signal indicating the key input operation for inputting the destination is input to the operation unit interface 23 (S56) or if the operation signal indicating the operation that is input to the operation unit 40 is input to the operation unit interface (S58), the processor 31 ends the operation.

If the processor 31 of the matching apparatus 30 fails to search for the captured image included in the input screen, the processor 31 may extend the estimation period and acquire the captured image and the destination from the second recognition apparatus 60. The processor 31 searches for the captured image included in the input screen again.

The processor 31 may perform OCR processing on a captured image acquired by the second recognition apparatus 60 according to the second algorithm to acquire a destination. For example, upon acquiring a captured image from the camera 3, the processor 61 of the second recognition apparatus 60 transmits the captured image to one of the matching apparatuses 30. The processor 31 of the matching apparatus 30 performs OCR processing on the received captured image and acquires a destination. Upon acquiring the destination, the processor 31 transmits the acquired destination to the second recognition apparatus 60. The processor 61 of the second recognition apparatus 60 stores the captured image and the received destination in association with each other in the memory 62.

The OCR processing according to the second algorithm may be performed by both the matching apparatus 30 and the second recognition apparatus 60.

The OCR processing according to the second algorithm may be performed by an external device. For example, the OCR processing according to the second algorithm is performed by cloud computing. In this case, the processor 61 of the second recognition apparatus 60 transmits a captured image to the external device. The processor 61 acquires a result of the OCR processing from the external device.

The functions of the second recognition apparatus 60 may be performed by any one of the matching apparatuses 30. The matching apparatus 30 may be connected to a plurality of operation units and displays.

Further, the matching apparatus 30 may be integrally formed with the operation unit and the display.

The first recognition apparatus 10 may be integrally formed with the VCS 20.

The first recognition apparatus 10 may also be integrally formed with the camera 3. The first recognition apparatus 10 may also be integrally formed with the sorter 2.

The VCS 20 may include an operation unit and a display.

The recognition system 1 may recognize a character string other than a destination of an article. Further, the character string recognized by the recognition system 1 is not limited to any particular configuration.

The recognition system configured as described above acquires a captured image in advance from the camera connected to the first recognition apparatus. The recognition system 1 performs OCR processing on the captured image in advance according to the second algorithm different from the first algorithm of the first recognition apparatus. The recognition system then stores a destination based on a result of the OCR processing in a memory or the like in advance.

The recognition system acquires, from the VCS, a captured image in which the first recognition apparatus fails to recognize a destination. The recognition system then searches captured images acquired in advance for a captured image that matches the captured image from the VCS. The recognition system then inputs a destination corresponding to the searched for captured image to the VCS.

As a result, the recognition system can effectively acquire the destination without modifying the first recognition apparatus.

In addition, the recognition system can input a destination to the VCS at a high speed by storing a destination based on the OCR processing according to the second algorithm in advance.

Even if the resolution of the captured image from the camera is lower than that of the captured image from the VCS, the recognition system can perform the OCR processing according to the second algorithm based on the high-resolution captured image.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus comprising:
a processor configured to:
    acquire, through a capture board and from an image input device, a display screen image, the display screen image being generated by the image input device based on a first captured image of a plurality of captured images output from an image acquisition device, wherein recognition of a character string included in the first captured image according to a first algorithm fails, and a resolution of the display screen image is lower than a resolution of the first captured image;
    acquire, from the image acquisition device through a communication interface, a subset of the plurality of captured images output from the image acquisition device as search candidates based on a time at which the display screen image was acquired, the subset of captured images being captured in an estimation period, the estimation period being a duration of time between a predetermined time preceding a capture time and another predetermined time elapsed from the capture time, wherein the capture time is a time at which the first captured image was captured, wherein the capture time is determined based on the time at which the display screen image was acquired;
    search the search candidates for a second captured image that matches the display screen image based on a degree of similarity of the images;
    acquire the character string included in the first captured image based on a result of the character recognition processing of the second captured image according to a second algorithm different from the first algorithm; and
    input the character string to the image input device through an input interface.

2. The information processing apparatus according to claim 1, wherein the processor is further configured to:
    transmit and receive data to and from a recognition apparatus through the communication interface, and
    the processor is configured to acquire the second captured image and the character string based on the result of the character recognition processing of the second captured image from the recognition apparatus through the communication interface.

3. The information processing apparatus according to claim 1, wherein an image resolution of the character string included in the display screen image is lower than an image resolution of the character string included in the second captured image.

4. The information processing apparatus according to claim 1, wherein the processor is configured to input an operation signal indicating a key input operation for inputting the character string through the input interface.

5. The information processing apparatus according to claim 1, comprising:
    an operation unit interface connected to an operation unit; and
    a display interface connected to a display, wherein the processor is configured to, if the processor fails to find the second captured image that matches the first captured image corresponding to the display screen image, display the display screen image on the display through the display interface, and input an operation signal indicating an operation that is input to the operation unit to the image input device through the input interface.

6. The information processing apparatus according to claim 1, wherein
    the first captured image is an image obtained by capturing an image of a surface of an article on which a destination is written, and
    the processor is configured to input the destination as the character string through the input interface.

7. A system comprising a recognition apparatus and an information processing apparatus, wherein
    the recognition apparatus includes a first processor configured to:
        acquire a plurality of captured images from an image acquisition device through an image acquisition device interface;
        transmit and receive data to and from the information processing apparatus through a first communication interface;
        perform character recognition processing on the plurality of captured images according to a second algorithm different from a first algorithm; and
        transmit the plurality of captured images and character strings based on a result of the character recognition processing to the information processing apparatus through the first communication interface, and
    the information processing apparatus includes a second processor configured to:
        acquire, through a capture board and from an image input device, a display screen image, the display screen image being generated by the image input device based on a first captured image of the plurality of captured images output from the image acquisition device, wherein recognition of a character string included in the first captured image according to the first algorithm fails, and a resolution of the display screen image is lower than a resolution of the first captured image;
        transmit and receive data to and from the recognition apparatus through a second communication interface;
        acquire a subset of the plurality of captured images as search candidates from the recognition apparatus through the second communication interface based on a time at which the display screen image was acquired, the subset of captured images being captured in an estimation period, the estimation period being a duration of time between a predetermined time preceding a capture time and another predetermined time elapsed from the capture time, wherein the capture time is a time at which the first captured image was captured, wherein the capture time is determined based on the time at which the display screen image was acquired;
        search the search candidates for a second captured image that matches the display screen image based on a degree of similarity of the images;
        acquire the character string included in the first captured image based on the result of the character recognition processing of the second captured image from the recognition apparatus through the second communication interface; and input the character string to the image input device through an input interface.

8. A control method executed by a processor, the method comprising:

performing character recognition processing on the plurality of captured images according to a second algorithm different from a first algorithm;

acquiring a display screen image from an image input device and through a capture board, the display screen image being generated by the image input device based on a first captured image of a plurality of captured images output from an image acquisition device, wherein recognition of a character string included in the first captured image according to the first algorithm fails, and a resolution of the display screen image is lower than a resolution of the first captured image;

acquiring, from the image acquisition device, a subset of the plurality of captured images as search candidates based on a time at which the display screen image was acquired, the subset of captured images being captured in an estimation period, the estimation period being a duration of time between a predetermined time preceding a capture time and another predetermined time elapsed from the capture time, wherein the capture time is a time at which the first captured image was captured, wherein the capture time is determined based on the time at which the display screen image was acquired;

searching search candidates for a second captured image that matches the display screen image based on a degree of similarity of the images;

acquiring a character string included in the first captured image based on a result of the character recognition processing of the second captured image according to the second algorithm; and inputting, to the image input device, the character string based on a result of the character recognition processing of the searched for captured image.

* * * * *